(12) United States Patent
Nakamura et al.

(10) Patent No.: US 6,185,034 B1
(45) Date of Patent: Feb. 6, 2001

(54) ELECTROCHROMIC DEVICE

(75) Inventors: Masatoshi Nakamura, Fujieda; Hideyuki Kikuchi, Shizuoka, both of (JP)

(73) Assignee: Murakami Corporation, Shizuoka (JP)

( * ) Notice: Under 35 U.S.C. 154(b), the term of this patent shall be extended for 0 days.

(21) Appl. No.: 09/404,976

(22) Filed: Sep. 24, 1999

(30) Foreign Application Priority Data

Nov. 20, 1998 (JP) .................................................. 10-347837

(51) Int. Cl.[7] ...................................................... G02F 1/15
(52) U.S. Cl. ............................ 359/265; 359/267; 359/274
(58) Field of Search ..................................... 359/265, 267, 359/269, 270, 273, 274, 275, 321, 614

(56) References Cited

U.S. PATENT DOCUMENTS

| 3,578,843 | * | 5/1971 | Castellion | 359/265 |
| 5,239,405 | * | 8/1993 | Varaprasad et al. | 359/272 |
| 5,604,626 | * | 2/1997 | Teowee et al. | 359/265 |
| 5,871,843 | * | 2/1999 | Yoneda et al. | 428/337 |

* cited by examiner

Primary Examiner—Huy Mai (57) ABSTRACT

An electrochromic layer consisting of an electrochromic material film and an electrolyte is provided between transparent electrode films of two glass substrates. An ultraviolet radiation stabilizing agent is not added to the electrolyte. A photocatalytic layer and a porous inorganic hydrophilic layer are formed on the front surface side of the front side glass substrate to make the surface of the device hydrophilic. The photocatalytic layer is excited by irradiation of ultraviolet radiation and decomposes dirt deposited on the surface of the porous inorganic hydrophilic layer, thereby maintaining the hydrophilic property. Since the photocatalytic layer absorbs ultraviolet radiation, occurrence of a photochromism in the electrochromic material film can be prevented.

9 Claims, 8 Drawing Sheets

ELECTROCHROMIC DEVICE

BACKGROUND OF THE INVENTION

This invention relates to an electrochromic device utilizing an electrochromism and, more particularly, to an electrochromic device capable of preventing occurrence of a photochromism without adding (or with addition of only a small amount of) an ultraviolet radiation stabilizing agent.

An electrochromic device utilizing an electrochromism is used, for example, for a dimming mirror including a dimming rearview mirror, and also for a dimmer. Electrochromism is a general term for denoting phenomenon in which color of a material is changed upon application of voltage to the material. A substance which exhibits such phenomenon is called an electrochromic material. Representative electrochromic materials include, e.g., tungsten oxide ($WO_3$) as an inorganic material and viologen as an organic material. In all of the electrochromic materials, moving of electrons upon application of voltage causes coloring and bleaching reactions.

Most of electrochromic materials present a photochromism. The photochromism is a phenomenon according to which a certain material in a state of solid or solution changes its color by irradiation of light (ultraviolet radiation or a short wavelength visible radiation) thereon and returns to an original color in a dark place. As the photochromism progresses, an electrochromic material is deteriorated and decomposed and, as a result, remains in a color-changed state and fails to return to the original state. As to the mechanism of the photochromism, it is considered that, in the case of an inorganic compound such as $WO_3$, irradiation of light exceeding its band gap (in $WO_3$, the band gap is 3.2 eV, i.e., 388 nm or below) brings electrons in the material to an excited state and thereby starts the coloring reaction. In the case of an organic compound, this phenomenon is considered to take place due to photoisomerization caused by movement of hydrogen atoms upon irradiation of light, generation of free radicals by dissociation and cleavage of a ring etc.

Figure 2:
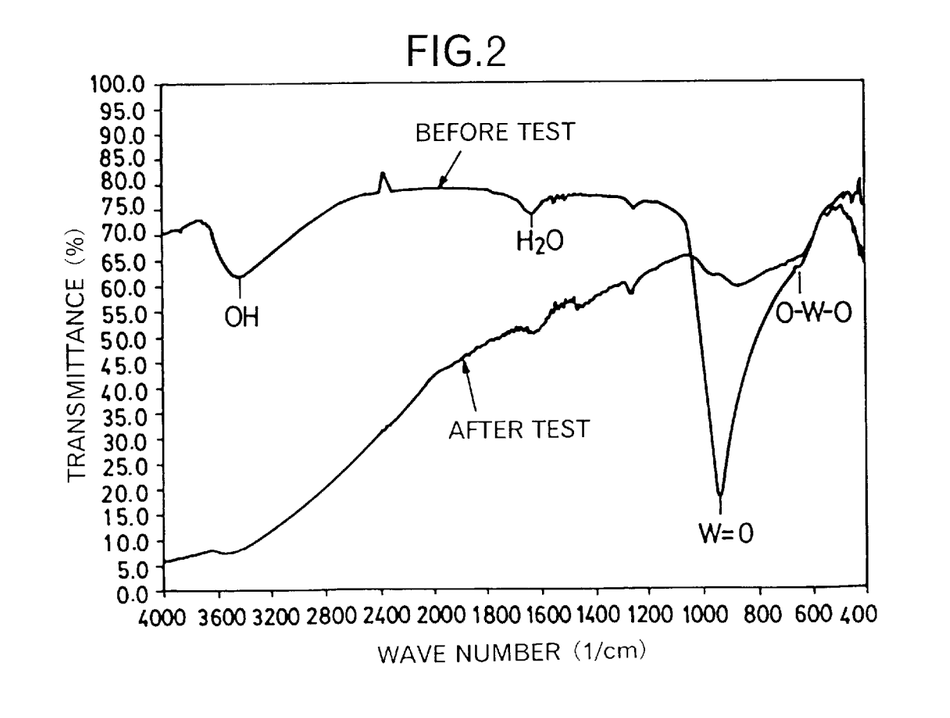
FIG. 2 is a characteristic diagram showing an infrared absorption spectrum of $WO_3$ before and after a weather resistance test (sunshine weather -o- meter) for 300 hours conducted with respect to a prior a device in which an ultraviolet radiation stabilizing agent is not added.

FIG. 2 shows an infrared absorption spectrum of $WO_3$ before and after a weather resistance test (sunshine weather -o- meter) for 300 hours. It will be seen that, by irradiation of ultraviolet radiation, the W=O bond has disappeared and $WO_3$ thereby has been destroyed. The photochromism is a phenomenon which should be avoided for the electrochromic device in which coloring and bleaching are controlled by application of voltage.

As a prior art electrochromic device which prevents occurrence of the photochromism, there is an electrochromic device disclosed in U.S. Pat. No. 5,140,455. In this electrochromic device, the photochromism can be prevented by dispersing an ultraviolet radiation stabilizing agent in an electrochromic solution and thereby absorbing ultraviolet radiation irradiated from outside.

The ultraviolet radiation stabilizing agents includes, for example, salicylic acid type ultraviolet radiation stabilizing agents such as phenyl salicylate, p-tert-butyle phenyl salicylate and p-octylphenyl salicylate; benzophenone type ultraviolet radiation stabilizing agents such as 2,4-dihydroxybenzophenone and 2-hydroxy-4-methoxybenzophenone; benzotriazole type ultraviolet radiation stabilizing agents such as 2-(2'-hydroxy-5'-methylphenyl) benzotriazole and 2-(2'-hydroxy-5'-tert-butylpheny) benzotriazole; and cyanoacrylate type ultraviolet radiation stabilizing agents such as 2-ethylhexyl-2-cyano-3,3'-diphenylacrylate and ethyl2-cyano-3, 3'diphenylacrylte.

Figure 3:
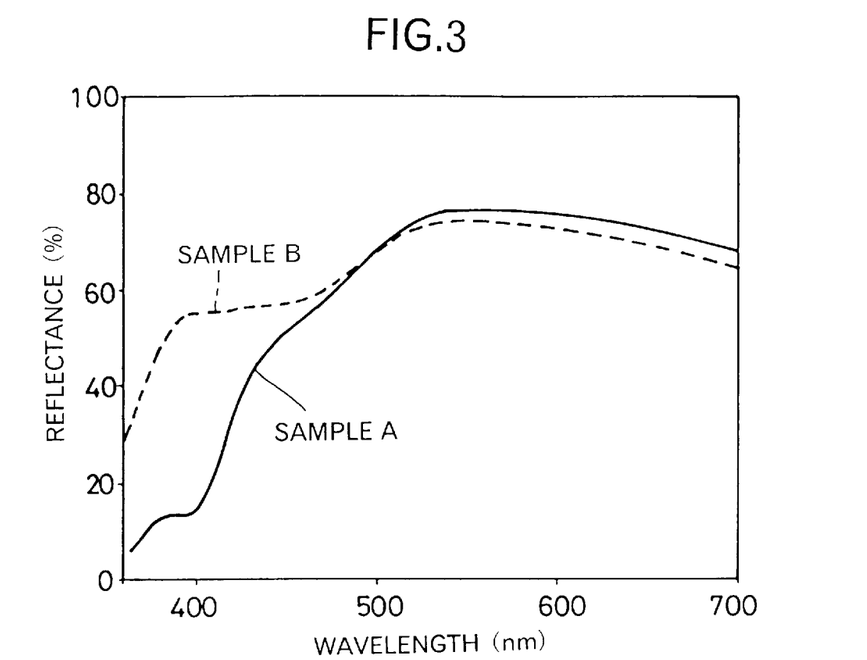
FIG. 3 is a characteristic diagram showing results of measuring reflection spectra of sample A in which 1 weight % of ultraviolet radiation stabilizing agent is added to the structure of Embodiment 6 (FIG. 10) without the photocatalytic layer 16 and the porous inorganic hydrophilic layer 18 and sample B of the same structure in which the ultraviolet radiation stabilizing agent is not added.

For effectively preventing the photochromism by adding the ultraviolet radiation stabilizing agent in an electrolyte or electrochromic solution, it is necessary to add a large amount of the ultraviolet radiation stabilizing agent. Since, however, the ultraviolet radiation stabilizing agent is colored per se, this method has the disadvantage that addition of a large amount of the ultraviolet radiation stabilizing agent impairs the tone of color of the electrochromic device. FIG. 3 shows reflectance spectra of a sample A in which 1 weight % of ultraviolet radiation stabilizing agent was added to the structure of FIG. 10 to be described later (without the provision of the photocatalytic layer and hydrophilic layer) and a sample B in which the ultraviolet radiation stabilizing agent was not added to the same structure. In the sample A, the reflectance below 490 nm is significantly reduced by the addition of the ultraviolet radiation stabilizing agent and the tone of color of the sample A thereby is impaired. For securing a sufficient effect of the ultraviolet radiation stabilizing agent, about 5 weight % of the ultraviolet radiation stabilizing agent is required.

It is, therefore, an object of the invention to provide an electrochromic device which has solved the above described problem of the prior art and is capable of preventing occurrence of the photochromism without adding (or with addition of only a small amount of) an ultraviolet radiation stabilizing agent.

SUMMARY OF THE INVENTION

For achieving the above described object of the invention, there is provided an electrochromic device comprising: transparent substrates, an electrochromic layer provided between said transparent substrates, said electrochromic layer containing no ultraviolet radiation stabilizing agent or containing less than 1 weight % of ultraviolet radiation stabilizing agent, and a transparent photocatalytic layer performing a photocatalytic reaction formed on the front surface of a front side substrate of said transparent substrates. In this specification, the term "electrochromic layer" designates an entire layer provided between opposite electrodes of two transparent substrates and includes, for example, a laminate of a film of an electrochromic material and an electrolyte, and an electrochromic solution in which an electrochromic material is dissolved or dispersed.

According to the invention, the photocatalytic layer formed on the front surface side of the device (the frontmost layer or a layer near to the frontmost layer) absorbs ultraviolet radiations and, therefore, the photochromism of the electrochromic material is inhibited. Accordingly, the necessity for adding an ultraviolet radiation stabilizing agent can be obviated (or if added, only a small amount will suffice) and impairing of the tone of color of the electrochromic device can thereby be prevented. Further, the photocatalytic layer decomposes and removes dirt deposited on the surface of the electrochromic device and, therefore, the surface of the device can be kept clean. The photocatalytic layer may be made of a photocatalytic substance only or may be made as a layer in which a photocatalytic substance and other material are mixed together.

In one aspect of the invention, there is provided an electrochromic device comprising transparent substrates, an electrochromic layer provided between said transparent substrates, said electrochromic layer containing no ultraviolet radiation stabilizing agent or containing less than 1 weight % of ultraviolet radiation stabilizing agent, a transparent photocatalytic layer performing a photocatalytic reaction formed on the front surface of a front side substrate of said transparent substrates, and a transparent porous inorganic hydrophilic layer formed on the front surface side of said transparent photocatalytic layer.

According to the invention, occurrence of the photochromism is prevented by the provision of the photocatalytic layer and, in addition, the surface of the device becomes hydrophilic by the provision of the porous inorganic hydrophilic layer and deposition of a waterdrop can thereby be prevented. Further, since dirt which is deposited inside of pores of the porous inorganic hydrophilic layer and blocks the pores is decomposed and removed by the photocatalytic layer, the hydrophilic property of the device can be maintained. The photocatalytic layer may be made of a film comprising, for example, $TiO_2$ and the porous inorganic hydrophilic layer may be made of, for example, a porous $SiO_2$ film.

A reflecting film may be formed on the rear surface side, as viewed from the front side substrate, of a rear side substrate of said transparent substrates whereby said electrochromic device constitutes a dimming mirror.

An electrode on the side of a rear side substrate of said transparent substrates applying voltage to said electrochromic layer may be made of a metal film which constitutes also a reflecting film whereby said electrochromic device constitutes a dimming mirror.

An reflecting film may be formed on the rear surface side, as viewed from the front side substrate, of a rear side substrate of said transparent substrates and a resistance heat generating element may be provided on further rear surface side of the rear side substrate, said heat generating element being supplied with electricity whereby said electrochromic device constitutes a dimming mirror.

The structure in which a reflecting film is formed can be adapted to be an exterior rearview mirror.

BRIEF DESCRIPTION OF THE DRAWINGS

In the accompanying drawings.

Description of Preferred Embodiments

Preferred embodiments of the invention will be described below. In respective embodiment, the same component parts are designated by the same reference characters. Embodiments 1 to 4 have been designed as transmitting type devices and Embodiments 5 to 10 have been designed as reflecting type devices. The structures of Embodiments 5 to 10 can be respectively adapted for use as an exterior rearview mirror. In all of the Embodiments, a photocatalytic layer and a porous inorganic hydrophilic layer are provided in the form of a laminate but the photocatalytic layer only may be provided. In any of these Embodiments, an ultraviolet radiation stabilizing agent is not added to an electrolyte or electrochromic solution. In the transmitting type devices, a photocatalytic layer (or a photocatalytic layer and a porous inorganic hydrophilic layer) may be formed on the rear surface side of the rear side substrate depending upon the purpose of use of the devices. In the description of the embodiments, the term "front side", "rear side" or "rear surface side" is used as viewed from the front surface of the electrochromic device.

Embodiment 1

Figure 1:
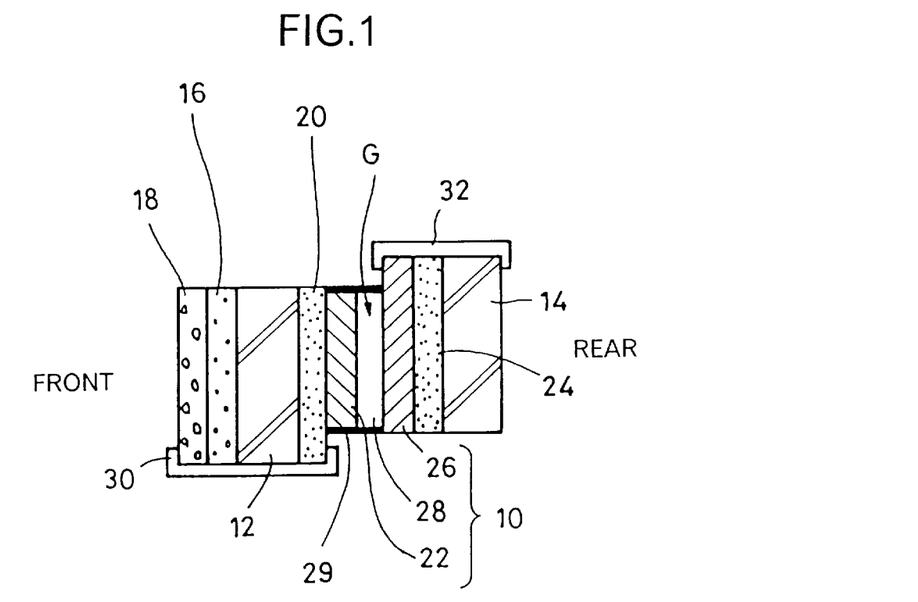
FIG. 1 is a sectional view of Embodiment 1 of the electrochromic device made according to the present invention shown in an enlarged scale in the direction of width of the device.

Embodiment 1 of the invention is shown in FIG. 1 in a section enlarged in the direction of width of the device. This electrochromic device has two colorless, transparent glass substrates 12 and 14 as the transparent substrates. On the front surface side of the front side glass substrate 12 (i.e., the glass substrate on the side from which the sun's radiation and ultraviolet radiation are incident) are laminated a photocatalytic layer 16 made of, e.g., $TiO_2$ and a porous inorganic hydrophilic layer 18 made of, e.g., SiO₂ by means of vacuum deposition, sputtering or sol-gel method. On the rear surface side of the glass substrate 12 is formed a transparent electrode film 20 made of, e.g., ITO. On the rear surface side of the electrode film 20 is formed an electrochromic material film 22 made of, e.g., WO₃. On the front surface side of the rear side glass substrate 14 are laminated a transparent electrode film 24 made of, e.g., ITO and an electrode protective layer 26 made of, e.g., SiO₂. The electrode protecting layer 26 is provided for preventing deposition and adhesion of iodine ion on the surface of the transparent electrode film 24 in a case where the electrolyte is made of lithium iodide and the driving method is set in such a manner that positive voltage is applied during the coloring mode and negative voltage is applied during the bleaching mode. If the driving method is set in other manner, there will be a case where the electrode protective layer need not be provided.

The front side glass substrate 12 and the rear side glass substrate 14 are opposed to each other across a small gap G. In the gap G, an electrolyte 28 in the form of liquid or gel is filled and this electrolyte 28 is sealed with a sealing material 29 which surrounds the electrolyte 28. A laminate of the electrochromic material film 22 and the electrolyte 28 constitutes an electrochromic layer 10.

A clip electrode 30 which is in clipping connection to the glass substrate 12 is connected the transparent electrode film 20. A clip electrode 32 which is in clipping connection with the glass substrate 14 is connected to the transparent electrode film 24. By applying negative polarity to the clip electrode 30 and positive polarity to the clip electrode 32 from an outside power source, the electrochromic material film 22 is colored and, by applying a reverse polarity between the two clip electrodes 30 and 32, the electrochromic material film 22 is bleached. By constructing the electrolyte 28 with, for example, a combination of ferrocene (Fe(C₅H₅)₂) and perchlorate lithium (LiClO₄), the electrochromic material film 22 can be bleached by short-circuiting. A reaction mechanism in case WO₃ is used as the electrochromic material is shown by the following formula:

where M is H⁺, Li⁺ etc, and e⁻ is an electron.

Normally, a counter-reaction (an oxidation reaction which is a counter-reaction of a reduction reaction of WO₃) expressed by the following formula is simultaneously carried out:

According to this electrochromic device, a dimming effect can be obtained by coloring and bleaching of the electrochromic material film 22. Water deposited on the surface of the device scatters about in a thin film by virtue of hydrophilic property of the porous inorganic hydrophilic layer 18 and an anti-fog effect thereby can be obtained. Ultraviolet radiation incident from the front surface side of the device is absorbed by the photocatalytic layer 16 and the photocatalytic layer 16 is excited to produce pairs of electron and hole therein. These electron-hole-pairs move to the surface of the porous inorganic hydrophilic layer 18 and react with air and water present on the surface of the porous inorganic hydrophilic layer 18 to produce highly oxidizing O₂⁻ (super oxide anion) and OH (hydroxyl radical). These substances decompose organic matters such as dirt deposited on the surface of the porous inorganic hydrophilic layer 18 and thereby prevent decrease in the hydrophilic property of the surface of the device. Since, further, the photocatalytic layer 16 absorbs ultraviolet radiation, occurrence of the photochromism in the electrochromic material film 22 is prevented. Accordingly, it is unnecessary to use an ultraviolet radiation stabilizing agent (if used, only a small amount will suffice) so that impairing of the tone of color of the device can be prevented. Further, since the photocatalyst is not diffused or dissolved in the electrolyte but is provided in the form of a layer on the glass substrate 12, the ultraviolet radiation prevention effect can be obtained with only a small amount of photocatalyst.

In a case where TiO₂ of an anatase type is used as the photocatalytic layer 16, the ultraviolet radiation absorbing effect is produced for ultraviolet radiations of 388 nm or below. In a case where TiO₂ of a rutile type is used as the photocatalytic layer 16, this effect is produced for ultraviolet radiations of 410 nm or below. The rutile type TiO₂, however, absorbs wavelength of 410 nm, i.e., a part of blue color content and, therefore, there is possibility that the tone of color of the device is impaired depending upon thickness of the film. Further, the anatase type TiO₂ is superior in the photocatalytic property (i.e., capability of decomposing organic matters). Therefore, the anatase type TiO₂ is preferable for preventing the photochromism in the electrochromic material film 22, maintaining the tone of color of the device and maintaining the hydrophilic property of the device. Further, since the band gap of WO₃ which is a representative electrochromic material is 3.2 eV which is the same as the band-gap of the anatase type TiO₂, use of the anatase type TiO₂ can protect WO₃ from ultraviolet radiation more efficiently. The ultraviolet radiation absorbing effect can be obtained also from a mixture of the anatase type and rutile type TiO₂ or a mixture of the anatase type TiO₂ and amorphous type TiO₂.

Figure 4:
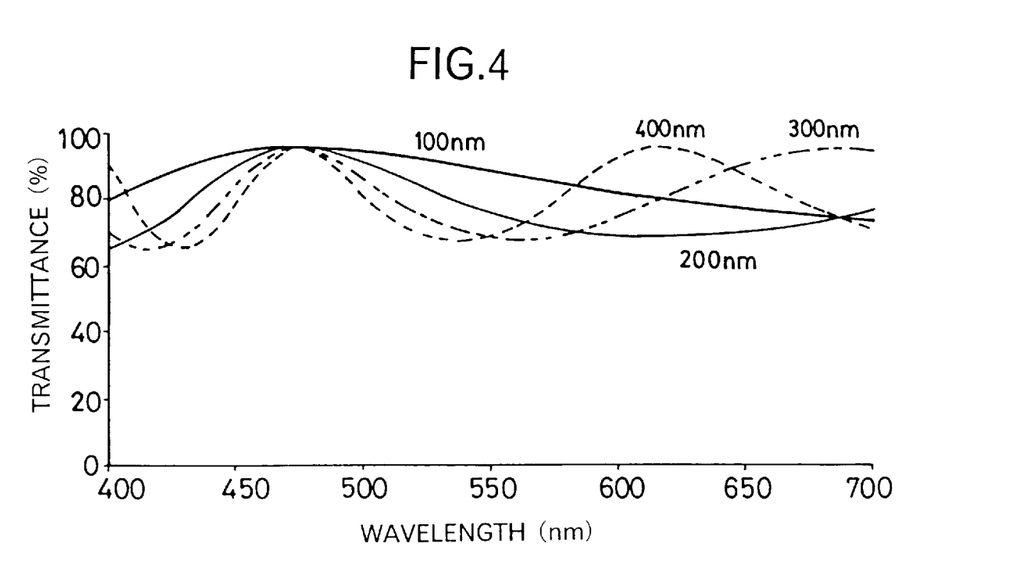
FIG. 4 is a characteristic diagram showing difference in transmittance depending upon thickness of the $TiO_2$.
Figure 5:
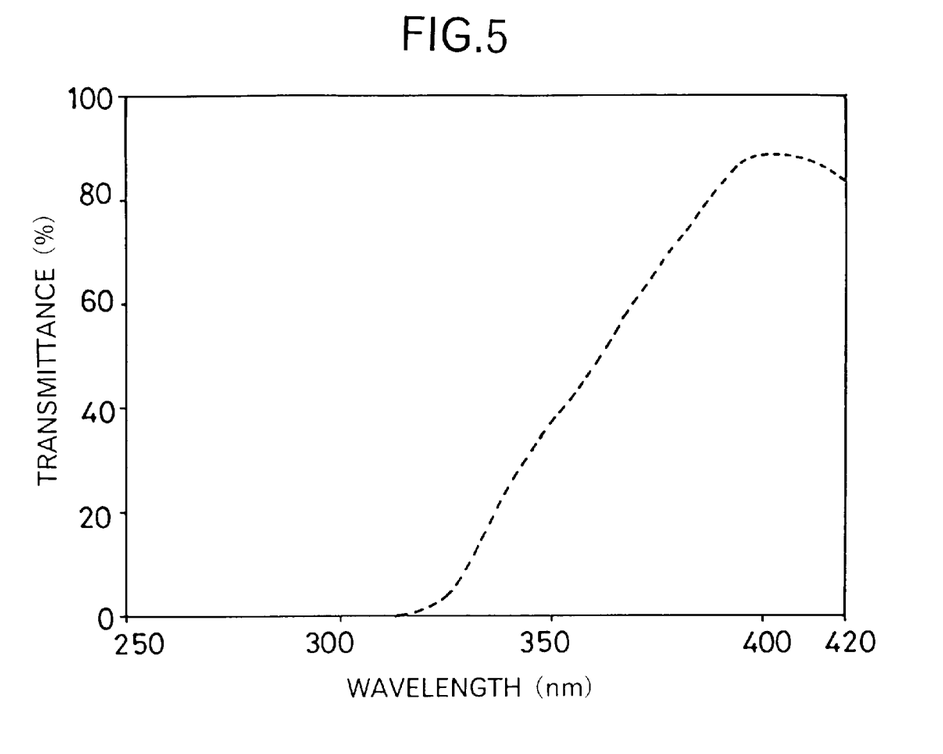
FIG. 5 is a characteristic diagram showing transmittance with respect to wavelengths below 420 nm in case a $TiO_2$ film of 200 nm is formed on soda glass having thickness of 1.9 mm.

In case the anatase type TiO₂ is used as the photocatalytic layer 16, film thickness of the photocatalytic layer 16 of 100 nm or over is sufficient for obtaining the organic matter decomposing effect by the photocatalytic effect and for obtaining the photochromism prevention effect. FIG. 4 shows transmittance of the device exhibited when the film thickness of the photocatalytic layer 16 made of TiO₂ is set to various values of 100 nm or over. According to this figure, when the film thickness is 300 nm or over, there is possibility that interference becomes stronger with the result that the tone of color is impaired. When the film thickness is about 200 nm, influence by interference is relatively small and imparting of the tone of color does not take place. Accordingly, in a case where the photocatalytic layer 16 is made of TiO₂, the film thickness should preferably be within a range from 100 nm to a200 nm. FIG. 5 shows a transmittance characteristic for wavelengths of 420 nm and below when a TiO₂ film of 200 nm is formed on soda glass having thickness of 1.9 mm.

On the other hand, the film thickness of the porous inorganic hydrophilic layer 18 should preferably be 50 nm or below. In case the film thickness is of this order, electron-hole-pairs move easily through the porous inorganic hydrophilic layer 18 and the photocatalytic reaction thereby proceeds rapidly.

In a case where the photocatalytic layer 16 is made of TiO₂ and the porous inorganic hydrophilic layer 18 is made of SiO₂ respectively by vacuum deposition, an example of film forming conditions for forming the TiO₂ layer 16 to an anatase type and the SiO$_2$ layer 18 to a porous layer is shown in the following Table 1.

TABLE 1

|  | Photocatalytic TiO$_2$ film | Porous SiO$_2$ film |
| --- | --- | --- |
| Speed of vacuum deposition | 0.3 nm/sec. | 0.5 nm/sec. |
| Partial pressure of oxygen | 1.0 × 10$^{-4}$ torr | 2.0 × 10$^{-4}$ torr |
| Temperature of substrate | 300° C. | 300° C. |

The film thickness and film forming conditions described above with respect to the photocatalytic layer 16 and the porous inorganic hydrophilic layer 18 can be applied also to Embodiments 2 to 10 to be described below.

Embodiment 2

Figure 6:
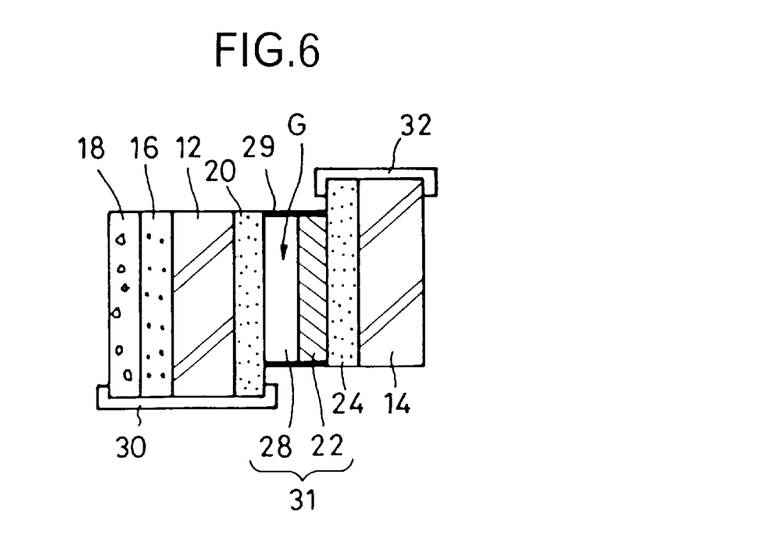
FIG. 6 is a sectional view showing Embodiment 2 of the present invention in an enlarged scale in the direction of width of the device.

The electrochromic device of FIG. 6 is made by forming an electrochromic material film 22 made of, e.g., WO$_3$ on the front surface side of a rear side glass substrate 14. An electrochromic layer 31 is composed of an electrolyte 28 and the electrochromic material film 22.

Embodiment 3

Figure 7:
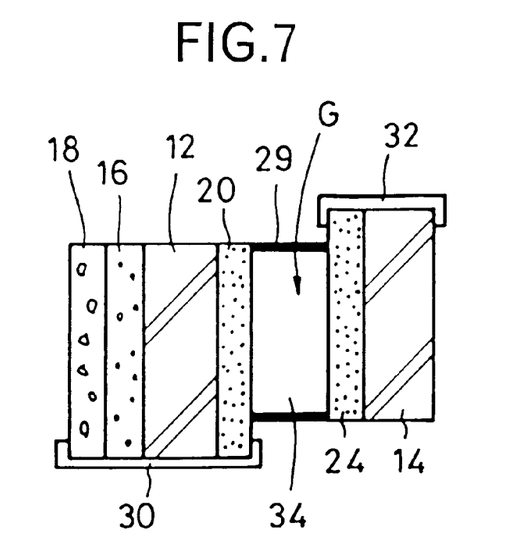
FIG. 7 is a sectional view showing Embodiment 3 of the present invention in an enlarged scale in the direction of width of the device.

The electrochromic device of FIG. 7 is made by forming transparent electrode films 20 and 24 made of, e.g., ITO on opposite surfaces of two glass substrates 12 and 14, filling an electrochromic solution 34 containing an electrochromic material such as viologen in a gap G across which the two glass substrates 12 and 14 are provided opposite to each other, and sealing the electrochromic solution 34 with a sealing material 29. The electrochromic solution 34 constitutes an electrochromic layer. Reaction mechanism of viologen is shown in the following formula:

bleaching                    coloring

Embodiment 4

Figure 8:
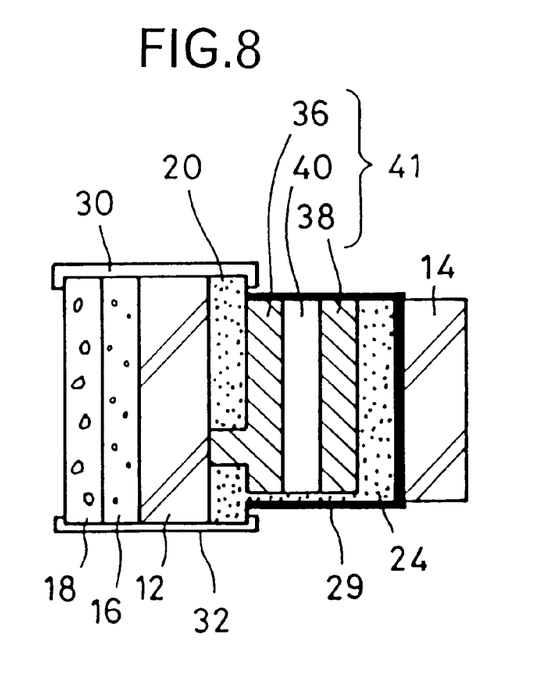
FIG. 8 is a sectional view showing Embodiment 4 of the present invention in an enlarged scale in the direction of width of the device.

The electrochromic device of FIG. 8 is made by sequentially laminating, on the rear surface side of a front side glass substrate 12, a transparent electrode film 20, an oxidation coloring layer (electrochromic material film) 36, a solid electrolyte 40, a reduction coloring layer (electrochromic material layer) 38 and a transparent electrode film 24. The oxidation coloring layer 36 and the reduction coloring layer 38 constitute an electrochromic layer 41.

Embodiment 5

Figure 9:
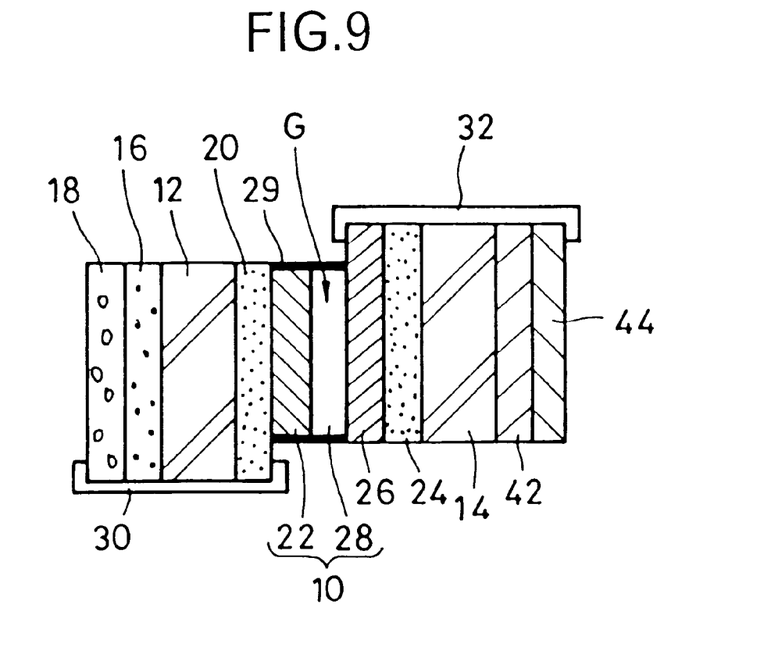
FIG. 9 is a sectional view showing Embodiment 5 of the present invention in an enlarged scale in the direction of width of the device.

The electrochromic device of FIG. 9 is made by, in the structure of FIG. 1, forming a reflecting film 42 made of, e.g., Cr, Ag or Al and a protective coating 44 on the rear surface side of the rear side glass substrate 14.

Embodiment 6

Figure 10:
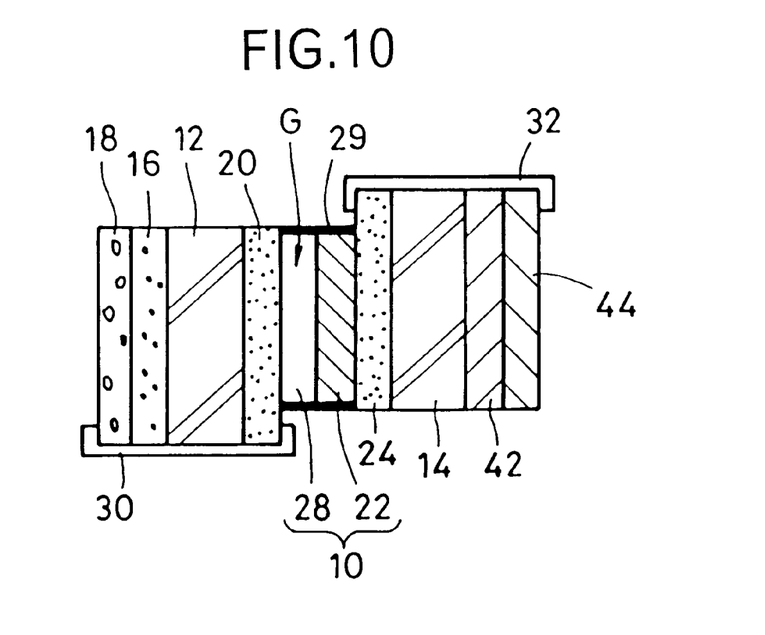
FIG. 10 is a sectional view showing Embodiment 6 of the present invention in an enlarged scale in the direction of width of the device.

The electrochromic device of FIG. 10 is made by, in the structure of FIG. 6 (Embodiment 2), forming a reflecting film 42 made of, e.g., Cr, Ag or Al and a protective coating 44 on the rear surface side of the rear side glass substrate 14.

Embodiment 7

Figure 11:
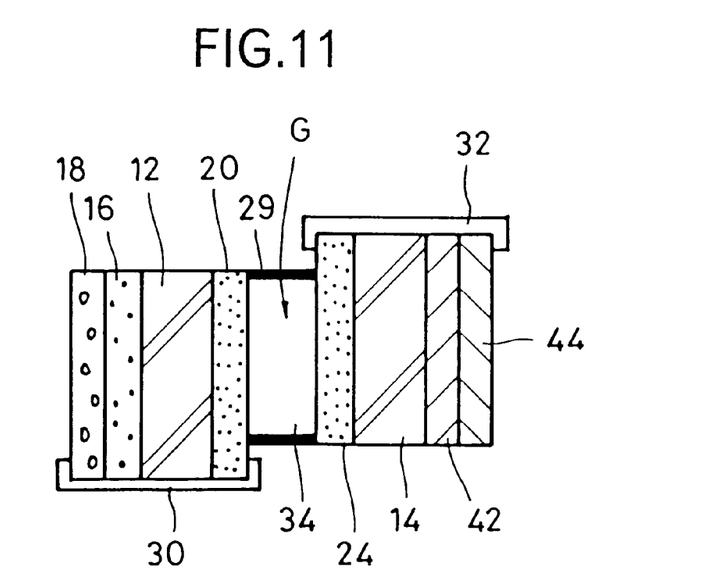
FIG. 11 is a sectional view showing Embodiment 7 of the present invention in an enlarged scale in the direction of width of the device.

The electrochromic device of FIG. 11 is made by, in the structure of FIG. 7 (Embodiment 3), forming a reflecting film 42 made, e.g., Cr, Ag or Al and a protective coating 44 on the rear surface side of the rear side glass substrate 14.

Embodiment 8

Figure 12:
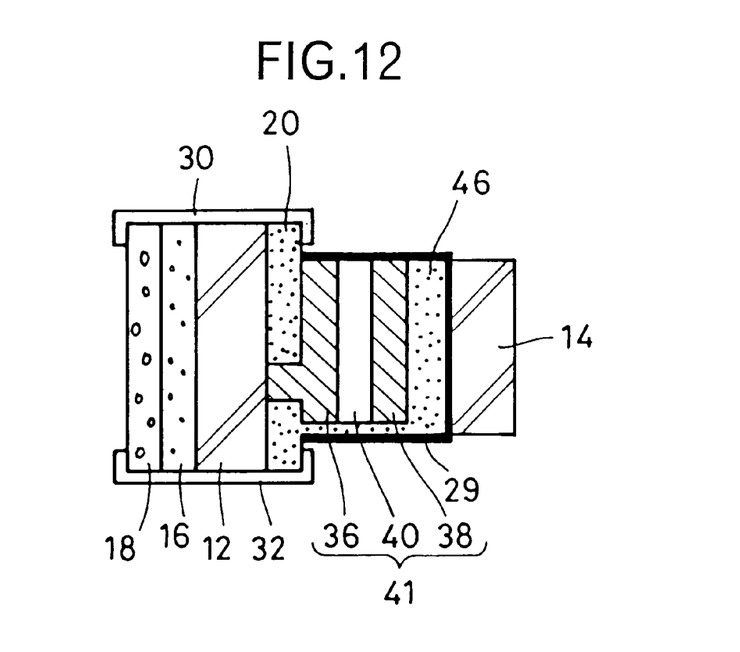
FIG. 12 is a sectional view showing Embodiment 8 of the present invention in an enlarged scale in the direction of width of the device.

The electrochromic device of FIG. 12 is made, in the structure of FIG. 8 (Embodiment 4), by forming an electrode-reflecting film 46 made of, e.g., Cr, Ag or Al instead of the transparent electrode film 24 of the rear side glass substrate 14 and thereby forming an anti-fog mirror.

Embodiment 9

Figure 13:
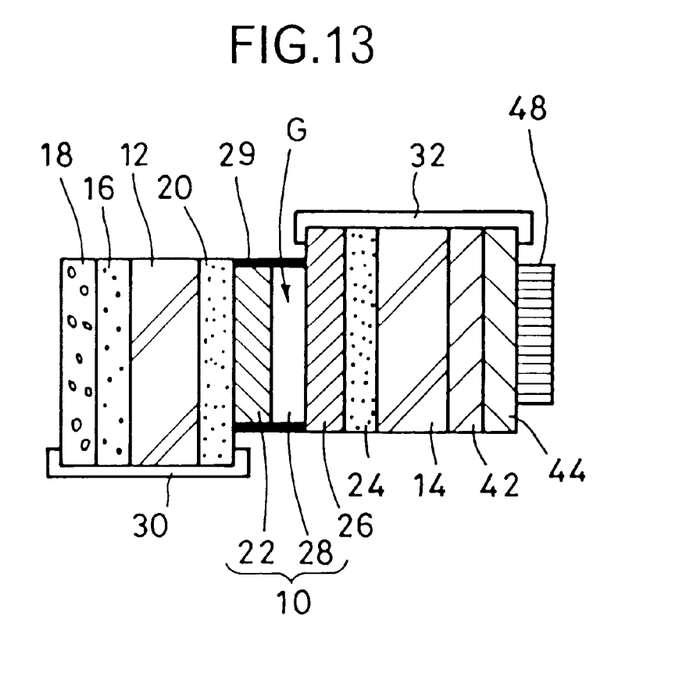
FIG. 13 is a sectional view showing Embodiment 9 of the present invention in an enlarged scale in the direction of width of the device.

The electrochromic device of FIG. 13 is made, in the structure of FIG. 9 (Embodiment 5), by adhering a resistance heat generating element 48 by means of an adhesive or bonding agent on the rear surface side of the rear side glass substrate 14. The resistance heat generating element 48 may be constructed by, e.g., a panel heater using PTC (positive characteristic thermistor). By heating the resistance heat generating element 48 by supplying electricity to it, water deposited on the surface of the device can be evaporated.

Embodiment 10

Figure 14:
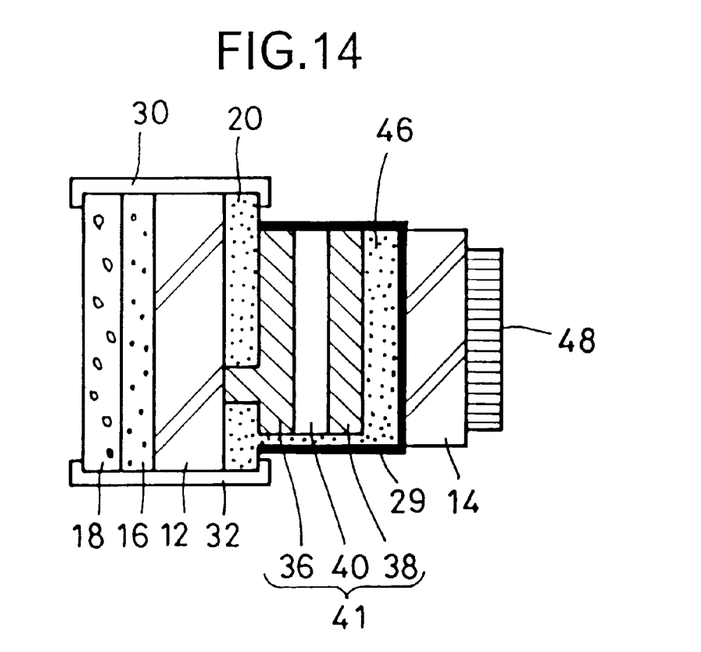
FIG. 14 is a sectional view showing Embodiment 10 of the present invention in an enlarged scale in the direction of width of the device.

The electrochromic device of FIG. 14 is made, in the structure of FIG. 12 (Embodiment 8), by adhering a resistance heat generating element 48 by means of an adhesive or bonding agent on the rear surface side of the rear side glass substrate 14. The resistance heat generating element 48 may be constructed by, e.g., a panel heater using PTC (positive characteristic thermistor). By heating the resistance heat generating element 48 by supplying electricity to it, water deposited on the surface of the device can be evaporated.

Table 2 shows change in reflectance as a result of a weather resistance test (sunshine weather -o- meter) conducted with respect to a sample C which is an example of the electrochromic device of the present invention having the structure of Embodiment 5 (FIG. 9) and a sample D in which the photocatalytic layer 16 and the porous inorganic hydrophilic layer 18 have been omitted. In the sample D in which the photocatalytic layer 16 and the porous inorganic hydrophilic layer 18 have been omitted, reflectance is decreased due to coloring caused by the photochromism. In contrast thereto, in the sample C of the present invention, no change has been observed in reflectance and appearance.

TABLE 2

|  | Reflectance before and after weather resistance test for 300 hours | |
| --- | --- | --- |
|  | before the test | after the test |
| Sample C of Embodiment 5 | 57% | 57% |
| Sample D in which photocatalytic layer 16 and porous inorganic hydrophilic layer 18 have been omitted | 50% | 20% |

Figure 15:
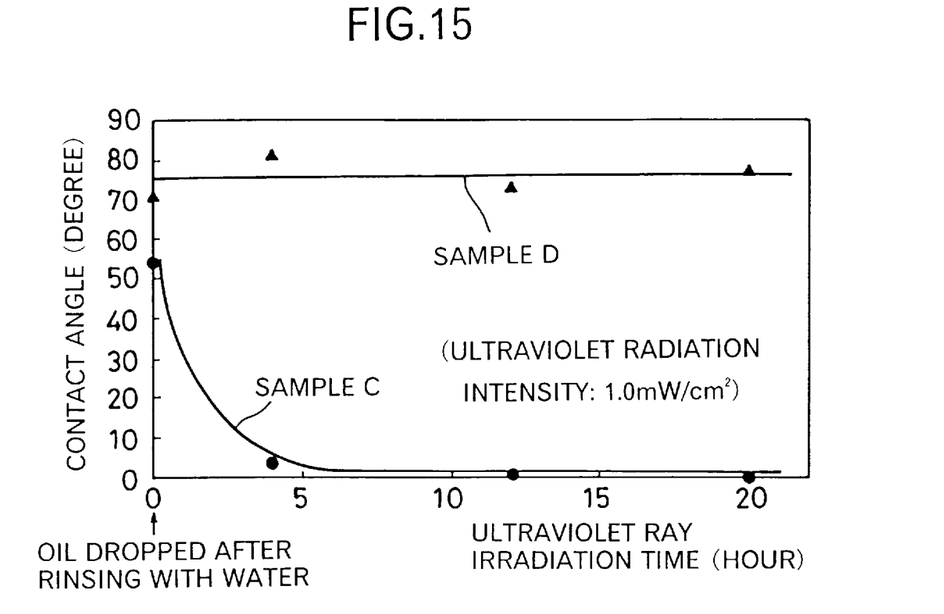
FIG. 15 is a characteristic diagram showing change in the contact angle on the surface of the device when ultraviolet radiation is irradiated on the surface of the device coated with oil measured with respect to sample C which has the structure of Embodiment 5 and sample D which has the same structure except that the photocatalytic layer 16 and the porous inorganic hydrophilic layer 18 have been omitted.

Change in the contact angle of waterdrop on the surface of the device when ultraviolet radiation (intensity being 1.0 mW/cm$^2$) is radiated on the surface of the device coated with oil as measured with respect to these samples C and D is shown in FIG. 15. In the sample D, the contact angle is originally high (about 70° or over) and when dirt is deposited thereon, it remains on the surface of the sample and thereby causes the contact angle to increase. For this reason, when a waterdrop is deposited on the sample, it assumes a shape of hemisphere having a small radius of curvature and, as a result, a rear image is inverted due to a lens effect with resulting degradation in visibility. In contrast, in the sample C which represents the present invention, dirt deposited on the sample C is decomposed by radiation of ultraviolet radiation and a high hydrophilic property can be maintained. Accordingly, when a waterdrop is deposited on the device, it is scattered about on the surface of the device which prevents occurrence of the lens effect and thereby enables the device to maintain an excellent visibility.

Figure 16:
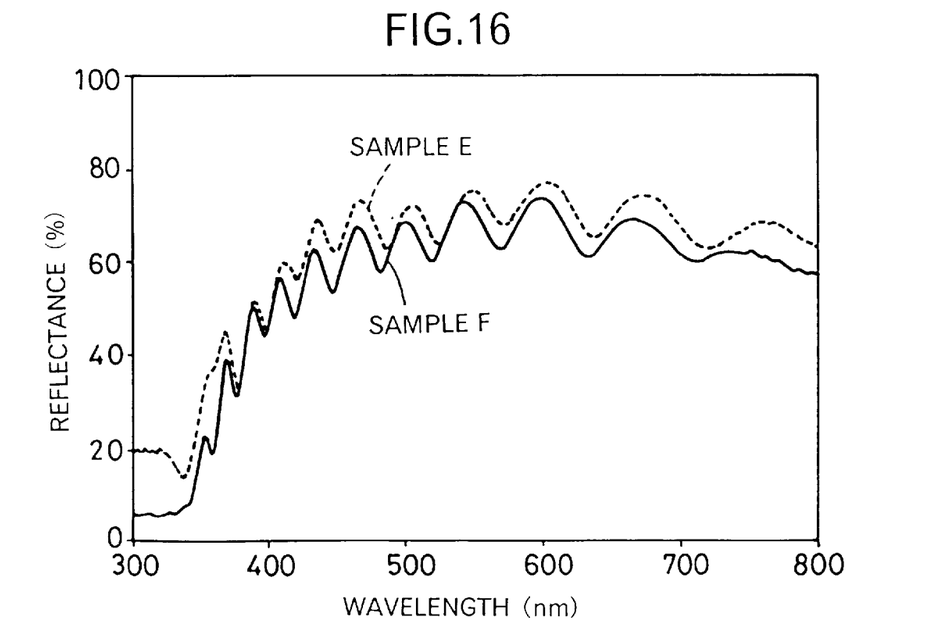
FIG. 16 is a characteristic diagram showing reflection spectra of sample E which has the structure of Embodiment 8 and sample F which has the same structure except that the photocatalytic layer 16 and the porous inorganic hydrophilic layer 18 have been omitted.

Reflection spectra of a sample E which has the structure of Embodiment 8 (FIG. 12) and a sample F which has the same structure except that the photocatalytic layer 16 and the porous inorganic hydrophilic layer 18 have been omitted are shown in FIG. 16. According to this figure, increase of several percent in reflectance is observed in the sample E as compared with the sample F but there is little change in the reflectance spectrum waveform in the sample E, showing that the tone of color is not impaired in sample E.

What is claimed is:

1. An electrochromic device comprising:

transparent substrates;

an electrochromic layer provided between said transparent substrates, said electrochromic layer containing no ultraviolet radiation stabilizing agent or containing less than 1 weight % of ultraviolet radiation stabilizing agent; and a transparent photocatalytic layer performing a photocatalytic reaction formed on the front surface of a front side substrate of said transparent substrates.

2. An electrochromic device as defined in claim 1 wherein said photocatalytic layer is made of a film comprising $TiO_2$.

3. An electrochromic device comprising:

transparent substrates;

an electrochromic layer provided between said transparent substrates, said electrochromic layer containing no ultraviolet radiation stabilizing agent or containing less than 1 weight % of ultraviolet radiation stabilizing agent;

a transparent photocatalytic layer performing a photocatalytic reaction formed on the front surface of a front side substrate of said transparent substrates; and a transparent porous inorganic hydrophilic layer formed on the front surface side of said transparent photocatalytic layer.

4. An electrochromic device as defined in claim 3 wherein said photocatalytic layer is made of a film comprising $TiO_2$ and said porous inorganic hydrophilic layer is made of a porous $SiO_2$ film.

5. An electrochromic device as defined in claim 1 wherein a reflecting film is formed on the rear surface side, as viewed from the front side substrate, of a rear side substrate of said transparent substrates whereby said electrochromic device constitutes a dimming mirror.

6. An electrochromic device as defined in claim 1 wherein an electrode on the side of a rear side substrate of said transparent substrates applying voltage to said electrochromic layer is made of a metal film which constitutes also a reflecting film whereby said electrochromic device constitutes a dimming mirror.

7. An electrochromic device as defined in claim 1 wherein a reflecting film is formed on the rear surface side, as viewed from the front side substrate, of a rear side substrate of said transparent substrates and a resistance heat generating element is provided on further rear surface side of the rear side substrate, said resistance heat generating element being supplied with electricity whereby said electrochromic device constitutes a dimming mirror.

8. An electrochromic device as defined in claim 1 wherein an electrode on the side of a rear side substrate of said transparent substrates applying voltage to said electrochromic layer is made of a metal film which constitutes also a reflecting film and a resistance heat generating element is provided on further rear surface side of the rear side substrate, said resistance heat generating element being supplied with electricity whereby said electrochromic device constitutes a dimming mirror.

9. An electrochromic device as defined in claim 5 which is adapted to be an exterior rearview mirror.

* * * * *